US008239783B2

(12) United States Patent
Fong et al.

(10) Patent No.: US 8,239,783 B2
(45) Date of Patent: Aug. 7, 2012

(54) INTEGRATED VIEWFINDER AND DIGITAL MEDIA

(75) Inventors: Jeffrey Cheng-Yao Fong, Seattle, WA (US); Donald Allen Barnett, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 200 days.

(21) Appl. No.: 12/705,800

(22) Filed: Feb. 15, 2010

(65) Prior Publication Data

US 2011/0119619 A1   May 19, 2011

Related U.S. Application Data

(60) Provisional application No. 61/262,832, filed on Nov. 19, 2009.

(51) Int. Cl.
*G06F 3/14* (2006.01)
*G06F 3/17* (2006.01)

(52) U.S. Cl. ........ 715/784; 345/589; 345/619; 345/646; 382/128; 600/425; 348/214; 348/222.1; 348/312; 348/333.01; 348/362; 348/372

(58) Field of Classification Search .......... 715/200–277, 715/700–867; 700/701–866; 709/201–229; 705/50–79; 345/30–111, 589, 619, 646; 348/206–231.9, 312, 333, 1, 348, 362, 372; 707/200–206; 382/128; 600/425
See application file for complete search history.

(56) References Cited

U.S. PATENT DOCUMENTS

| 6,147,703 | A | 11/2000 | Miller | |
|---|---|---|---|---|
| 6,233,015 | B1 | 5/2001 | Miller | |
| 6,636,234 | B2* | 10/2003 | Endo et al. | 345/646 |
| 7,369,691 | B2* | 5/2008 | Kondo et al. | 382/128 |
| 7,493,037 | B2 | 2/2009 | Inaba et al. | |
| 2002/0171666 | A1* | 11/2002 | Endo et al. | 345/619 |
| 2003/0206179 | A1* | 11/2003 | Deering | 345/589 |
| 2004/0249270 | A1* | 12/2004 | Kondo et al. | 600/425 |
| 2006/0268007 | A1 | 11/2006 | Gopalakrishnan | |
| 2009/0278949 | A1 | 11/2009 | McMahan | |

FOREIGN PATENT DOCUMENTS

WO        WO0126759        4/2001

OTHER PUBLICATIONS

"Canon EOS 5D Major Features," Rob Galbraith Digital Photography Insights brochure, retrieved online at http://www.robgalbraith.com/bins/multi_page.asp?cid=7-7885-7975-7976, 7 pp., 2005.

(Continued)

*Primary Examiner* — Ruay Ho
(74) *Attorney, Agent, or Firm* — Klarquist Sparkman, LLP

(57) ABSTRACT

A user interface can display active and passive content. For example, a camera viewfinder image can be displayed on a screen, as part of a strip, concatenated with one or more other images, for example, images that were previously taken with the camera. A user can cause the viewfinder image and the other images to move together across the screen. This can allow a user to easily examine the other images and the viewfinder image without, for example, switching between different screens in a user interface. Media captured with a device can be associated with a media category by positioning a user interface element near one or more other elements associated with the category.

19 Claims, 10 Drawing Sheets

OTHER PUBLICATIONS

Eee PC User Manual, Windows XP Edition, Eee PC 1005 Series (1005HA/1005HAB), 60 pp., publicly available at least as early as May 21, 2009.

Hercules Dualpix Infinite Webcam Station Evolution Manual, 18 pp., Sep. 29, 2008.

Hercules Xtra Controller Pro Manual, 10 pp., Jul. 22, 2009.

iPhone User Guide for iPhone OS 3.1 Software, 217 pp., Sep. 2009.

"Kodak DC240/DC280 Zoom Digital Camera Quick Tips," Eastman Kodak Co., 2 pp., 1999.

Nokia N73, "Shoot Quality Pictures on the Go," retrieved Nov. 19, 2009 at http://www.streetdirectory.com/travel_guide/130267/nokia/nokia_n73_shoot_quality_pictures_on_the_go.html, 2 pp.

* cited by examiner

US 8,239,783 B2

INTEGRATED VIEWFINDER AND DIGITAL MEDIA

CROSS-REFERENCE TO RELATED APPLICATION

This application claims the benefit of Fong et al., U.S. Provisional Application No. 61/262,832, titled "INTEGRATED VIEWFINDER AND DIGITAL MEDIA" and filed Nov. 19, 2009, which is incorporated herein by reference.

FIELD

The disclosed technologies are related to user interfaces, for example, user interfaces for use with digital cameras.

BACKGROUND

Software and devices related to digital media often present active content in a first user interface element and passive content in a second user interface element. For example, in a digital camera context, a user often cannot simultaneously see a viewfinder image and one or more other images (e.g., images that were previously taken with the camera and/or images that were provided from another source).

SUMMARY

A camera viewfinder image can be displayed on a screen and as part of a strip, concatenated with one or more other images, for example, images that were previously taken with the camera. A user can cause the viewfinder image and the other images to move together across the screen. This can allow a user to easily examine the other images and the viewfinder image without, for example, switching between different screens in a user interface.

Media captured with a device can be associated with a media category by positioning a user interface element near one or more other elements associated with the category.

In some embodiments, a graphical user interface comprises: a viewfinder display portion configured to display in a strip, on a hardware display, at least a portion of one or more real-time images from at least one imaging device; and a stored image display portion configured to display in the strip, on the hardware display, at least a portion of one or more stored images, wherein the viewfinder display portion and the stored image display portion are configured to move in a common direction on the hardware display in response to one or more user inputs. In some cases, only a portion of the one or more real-time images is visible on the hardware display. The one or more real-time images are updated for at least a portion of time. The viewfinder display portion and the stored image display portion are configured to move in a common direction on the hardware display in response to one or more user inputs and relative to one or more other graphical user interface elements. In some cases, only a portion of the one or more stored images is visible on the hardware display. The user interface is configured to receive one or more commands for processing the one or more stored images. In some embodiments, at least some of the one or more stored images represent still images. In further embodiments, at least some of the one or more stored images represent video sequences. The viewfinder display portion and the stored image display portion can be configured to move in the common direction using a scrolling motion. The graphical user interface can be further configured to display, in the first viewing area portion, one or more captured images in place of the viewfinder image.

Further embodiments of a graphical user interface comprise: a new element region for displaying a representation of a new media element; a first media category region associated with a first media element category; and a second media category region associated with a second media element category, wherein the new element region is configured to be positioned relative to the first media category region and relative to the second media category region to indicate one or more categories with which the new media element is to be associated. The new element region is configured to be displayed as sliding relative to the first media category region and the second media category region. The new element region comprises a viewfinder region, and the new media element comprises at least one viewfinder image from a digital imaging element. In some cases, the first media element category region is configured to display one or more media elements associated with the first media element category, and the second media element category region is configured to display one or more media elements associated with the second media element category.

An embodiment of a computer-implemented method comprises: displaying, on a hardware display, an active content display portion; and displaying, on the hardware display, a passive content display portion, the active content display portion and the passive content display portion being configured to move a common direction on the hardware display in response to one or more user inputs and relative to one or more other elements being displayed on the hardware display. The active content display portion can be configured to display one or more viewfinder images, and the passive content display portion can be configured to display one or more previously recorded images.

One or more computer-readable storage media can comprise instructions which, when executed by a computer, cause the computer to display any of the disclosed graphical user interfaces. One or more computer-readable storage media can comprise instructions which, when executed by a computer, cause the computer to perform any of the disclosed methods.

An electronic device can be configured to perform any of the disclosed methods and/or display any of the disclosed graphical user interfaces.

The foregoing and other features of the disclosed technologies will become more apparent from the following detailed description, which proceeds with reference to the accompanying figures.

DETAILED DESCRIPTION

Figure 1:
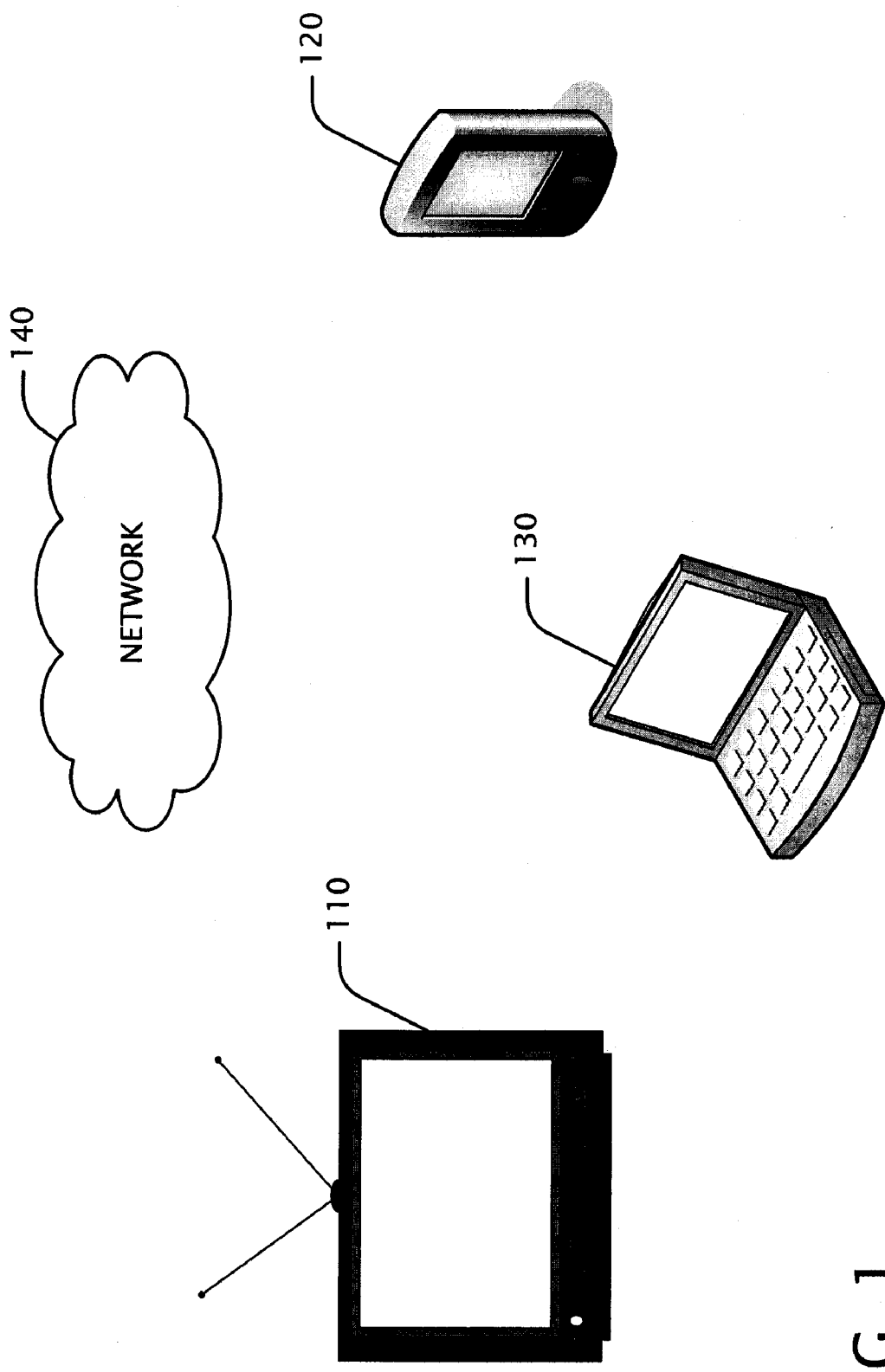
FIG. 1 shows exemplary embodiments of one or more devices which can be used with at least some of the disclosed technologies.

As shown in at least some of the embodiments discussed below, a digital camera viewfinder can be displayed such that it is integrated with stored digital media. Accordingly, a user has an experience that the viewfinder is one of two or more photos (or videos) in a series. The user can provide a user interface command (e.g., a finger flick) and scroll through stored images that are concatenated to a region displaying the viewfinder. This viewfinder region moves in the user interface just like one of the stored images in the series.

Disclosed below are embodiments of user interface technologies and/or related systems and methods. The embodiments should not be construed as limiting in any way. Instead, the present disclosure is directed toward all novel and non-obvious features and aspects of the various disclosed methods and systems, and equivalents thereof, alone and in various combinations and subcombinations with one another. The methods disclosed herein are not performed purely in the human mind.

As used in this application and in the claims, the singular forms "a," "an" and "the" include the plural forms unless the context clearly dictates otherwise. Additionally, the term "includes" means "comprises." When used in a sentence, the phrase "and/or" can mean "one or more of" the elements described in the sentence. Embodiments described herein are exemplary embodiments of the disclosed technologies unless clearly stated otherwise.

Although the operations of some of the disclosed methods and systems are described in a particular, sequential order for convenient presentation, it should be understood that this manner of description encompasses rearrangement, unless a particular ordering is required by specific language set forth below. For example, operations described sequentially can in some cases be rearranged or performed concurrently.

For the sake of simplicity, the figures may not show the various ways in which the disclosed methods and systems can be used in conjunction with other methods and systems. Additionally, the description sometimes uses terms like "display," "capture" and "send" to describe the disclosed technology. These and other terms are high-level abstractions of the actual operations that are performed. The actual operations that correspond to these terms may vary depending on the particular implementation and are readily discernible by one of ordinary skill in the art.

Any of the methods described herein can be performed using software comprising computer-executable instructions stored on one or more computer-readable storage media. Furthermore, any intermediate or final results of the disclosed methods can be stored on one or more computer-readable storage media. Computer-readable storage media can include non-volatile storage such as, for example, read-only memory (ROM), flash memory, hard disk drives, floppy disks and optical disks. Computer-readable storage media can also include volatile storage such as, for example, random-access memory (RAM), device registers and processor registers. Any such software can be executed on a single computer or on a networked computer (for example, via the Internet, a wide-area network, a local-area network, a client-server network, or other such network).

The software embodiments disclosed herein can be described in the general context of computer-executable instructions, such as those included in program modules, which can be executed in a computing environment on a target real or virtual processor. Generally, program modules include routines, programs, libraries, objects, classes, components, data structures, etc., that perform particular tasks or implement particular abstract data types. The functionality of the program modules can be combined or split between program modules as desired in various embodiments. Computer-executable instructions for program modules can be executed within a local or distributed computing environment. For clarity, only certain selected aspects of the software-based implementations are described. Other details that are well known in the art are omitted. For example, it should be understood that the disclosed technologies are not limited to any specific computer language, program, or computer. For instance, the disclosed embodiments can be implemented using a wide variety of commercially available computer systems. Any of the disclosed methods can alternatively be implemented (partially or completely) in hardware (e.g., an ASIC, PLD, or SoC). Portions of one or more disclosed methods can be executed by different parts of a distributed computing environment.

Additionally, intermediate or final results (e.g., one or more images), created or modified using any of the disclosed methods can be stored on one or more tangible computer-readable storage media. In some cases, intermediate or final results (e.g., one or more images), produced by any of the disclosed methods, can be presented to a user using a suitable device (e.g., a computer monitor). Such presentation and/or storing can be performed as part of a computer implementation of any of the disclosed methods.

Furthermore, any of the software embodiments (comprising, for example, computer-executable instructions for causing a computer to perform any of the disclosed methods) can be transmitted, received, or accessed through a suitable communication means. Similarly, intermediate or final method results, created or modified using any of the disclosed methods, can be transmitted, received, or accessed through a suitable communication means. Such suitable communication means include, for example, the Internet, the World Wide Web, an intranet, cable (including fiber optic cable), magnetic communication means, electromagnetic communication means (including RF, microwave, and infrared communications), electronic communication means, or other such communication means. Such communication means can be, for example, part of a shared or private network.

At least some of the embodiments disclosed herein are described with respect to still images (e.g., still photographic images). However, at least some technologies described herein can also be used for various forms of content or media elements, including, for example, one or more of video images (e.g., video sequences, with or without corresponding audio information), still images, and sound recordings.

FIG. 1 shows exemplary embodiments of one or more electronic devices which can be used with at least some of the disclosed technologies, including a television or other display device 110 (possibly acting in conjunction with a digital set-top box (not shown)), a handheld computing device 120 (e.g., a personal digital assistant (PDA), a cell phone, a smartphone, an eBook reader, a video game player, a portable music or video player) and a personal computer 130 (e.g., a desktop computer, a laptop computer, a netbook, a server, a thin client, a video game console). In particular embodiments, two or more of the devices 110, 120, 130 are used in combination with one or more of the disclosed technologies. For example, the handheld computing device 120 can be used to control images displayed on the television or other display device 110. Any of the devices 110, 120, 130 can be configured to receive data from and/or transmit data to a network 140.

Figure 2:
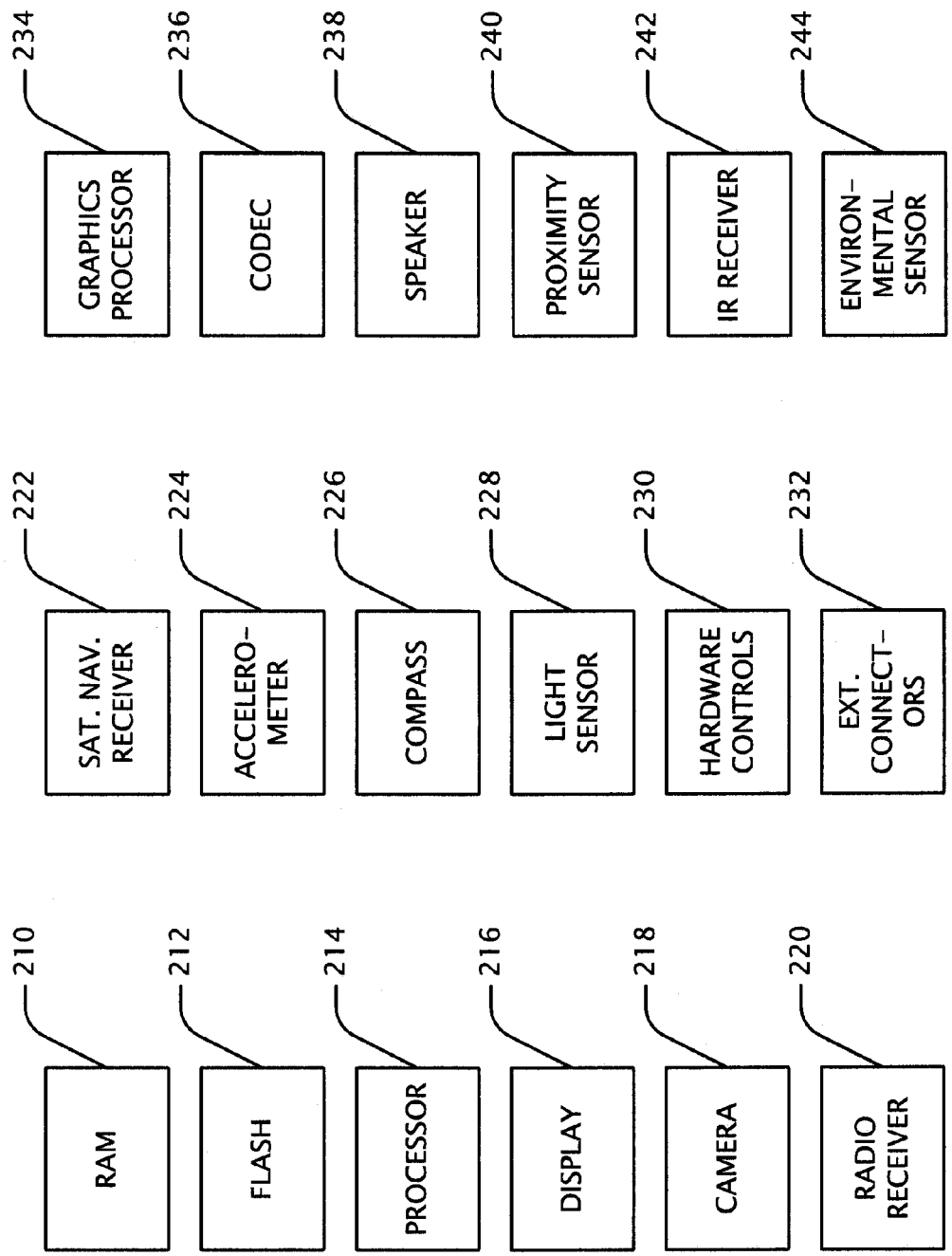
FIG. 2 shows exemplary components found in devices used with one or more of the disclosed technologies.

FIG. 2 shows exemplary components found in devices used with at least some of the disclosed technologies (e.g., the devices of FIG. 1). The components include, for example: one or more types of memory, such as RAM 210, flash memory 212 and/or a hard drive (not shown); a processor 214; a display 216 (e.g., a touch-sensitive or non-touch-sensitive display); a camera 218 or other digital imaging element (including, for example, a flash and/or focusing hardware; the camera may be integrated into the device or be a stand-alone camera coupled to the device); a radio receiver 220 (e.g., AM/FM receiver, cellular phone receiver, Wi-Fi receiver); a satellite navigation receiver 222 (e.g., GPS, A-GPS, or other satellite navigation system); an accelerometer 224 (sensitive on, for example, one, two or three axes); a compass 226; a light sensor 228; a hardware control 230 (e.g., button, keyboard, keypad, directional control pad (D-pad)); an external connector 232 (e.g., video-out port, USB port, headphone jack, microphone jack, memory card slot); a graphics processor 234; a codec 236; a speaker 238; a proximity sensor 240; an infra-red (IR) receiver 242; and other environmental sensors 244 (e.g., pressure sensor, moisture sensor). Various embodiments of devices can use two or more of any of these components (e.g., two or more hardware controls 230).

Figure 3:
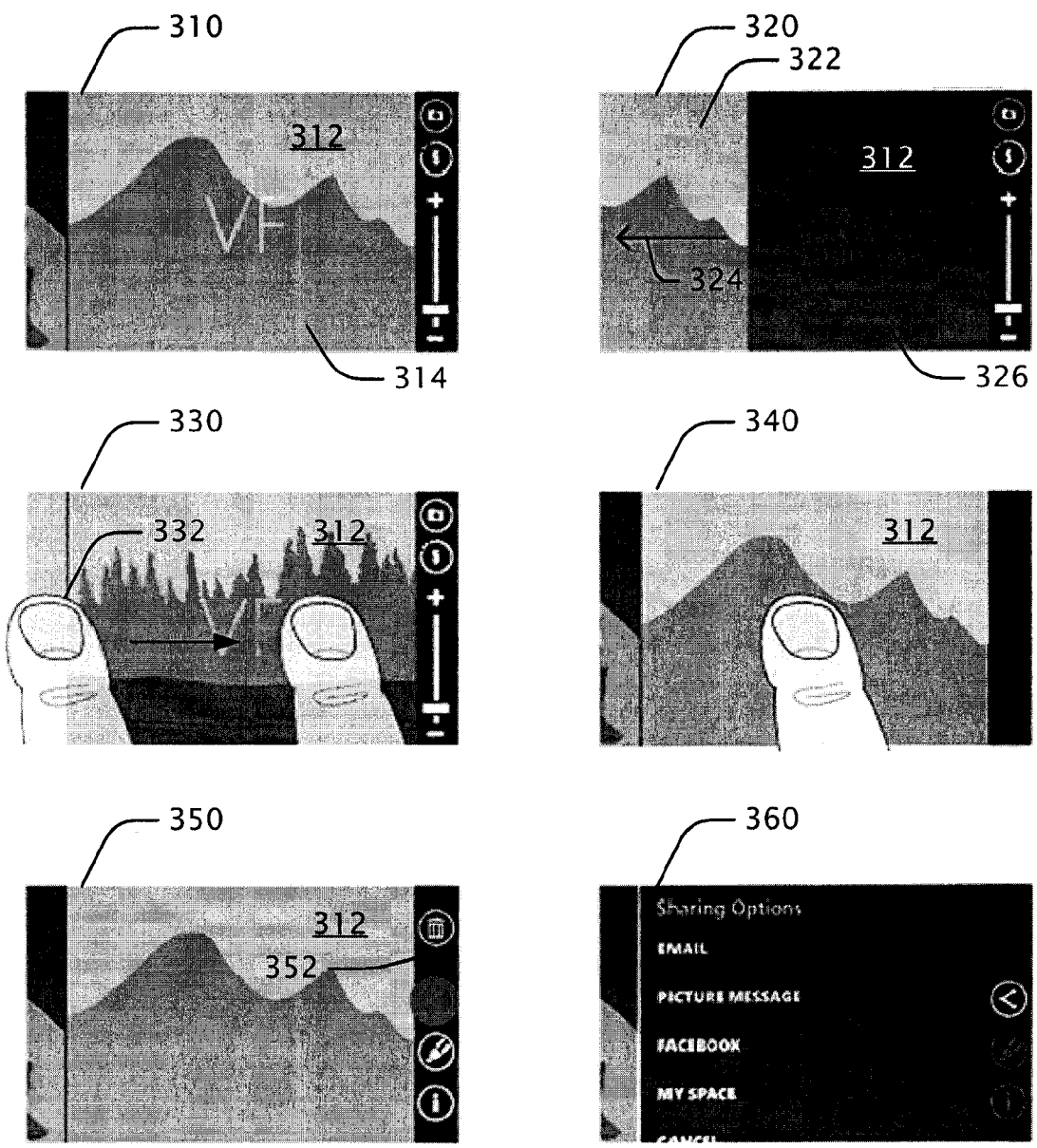
FIG. 3 shows screenshots of one exemplary embodiment of a viewfinder user interface for a camera.

FIG. 3 shows screenshots of one exemplary embodiment of a viewfinder user interface (UI) for a camera (e.g., a digital camera used in conjunction with one or more of the devices of FIG. 1). Screenshot 310 shows a viewfinder region 312 for the camera, which displays an image 314 (or an approximation of an image) that can be captured with the camera. When a picture is taken with the camera, the captured image 322 is displayed in the viewfinder region 316 for a set amount of time (e.g., 0.5 seconds, 1 second, 2 seconds, or another amount of time). Then, as shown in screenshot 320, the captured image 322 is removed from the viewfinder region 312. In the depicted embodiment, the captured image 322 slides off the left side of the viewfinder region 312 (as indicated by an arrow 324), but one or more other transitions can also be used. In place of the captured image 322, a monochrome or patterned image 326 can be shown in the viewfinder region 312.

In the depicted embodiment, a user input can cause an image (e.g., a most recently captured image) to appear in the viewfinder region 312. In the screenshot 330, the user input comprises a stroke with a finger 332 across at least a portion of the viewfinder region 312. In further embodiments, the user input comprises a tap on a portion of the region 312. The user input can also be performed on a portion of the captured image 322 (e.g., before it slides fully off of the viewfinder region 312).

When an image is shown in the viewfinder region 312, one or more user inputs can cause a menu to appear. For example, screenshot 340 shows a user tapping the image in the region 312. Then, as shown in screenshot 350, a menu 352 appears. The menu 352 makes available to the user various commands or groups of commands. For example, screenshot 360 shows exemplary commands that are displayed as a result of selecting the "Share" icon in the menu 352. The commands shown in screenshot 360 include commands for sending an image by e-mail, sending an image via a picture message, posting an image to a website (e.g., Facebook, My Space, or another site), as well as one or more other commands. Other possible commands include, for example, deleting, renaming and retouching the image.

Generally speaking, an image displayed in any embodiment of a user interface described herein can be associated with one or more internet addresses, file names, user accounts, hardware devices or computing "clouds" (e.g., virtualized resources obtained as a service over a network, such as the Internet). For example, an image can be uploaded to a website, associated with or sent to a user account for an internet service (e.g., Facebook, My Space, or another site), sent by e-mail or other message service (including, for example, as an attachment), sent to another computer or handheld computing device (e.g., a telephone or a PDA), or stored on a remote storage or processing service. An association for an image can be indicated before or after an image is captured by the camera. In particular embodiments, a device can be configured to exchange information with a computing cloud about the availability or status of one or more cloud-based services. The device can transmit an image or other file to a cloud with a list of one or more destinations to which the file should be sent (e.g., one or more web sites or storage services). This can allow the device to have the file sent to multiple destinations while transmitting only one copy of the file.

A device can be configured to receive a command to upload, associate or send an image when the device is not connected to a network. When the device is later connected to the network, the device can execute the command to upload, associate or send the image. Further, a device can store information about the file structures of online storage options (e.g., in which folder a file can be stored for a given website). In further embodiments, a group of two or more images can be arranged (e.g., reordered), and this arrangement data can be provided to a storage location, cloud, website, another device, or to one or more other services.

Figure 4A:
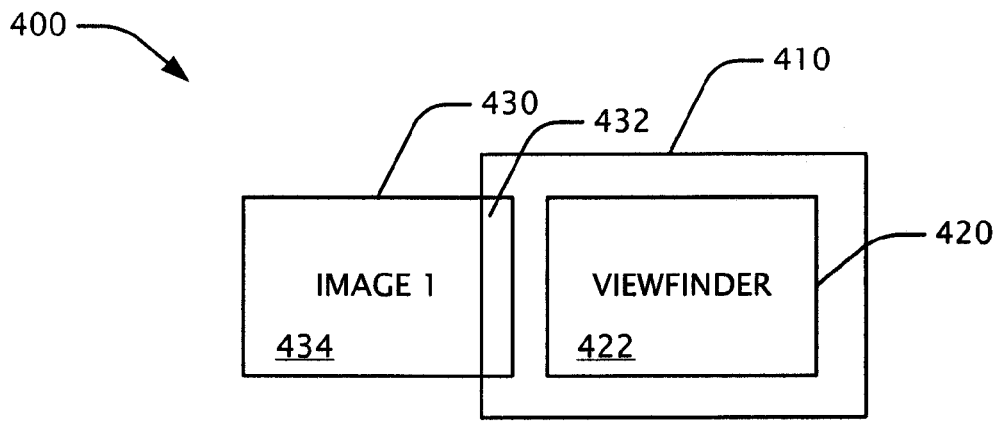
FIGS. 4A-4C show block diagrams of exemplary embodiments of a viewfinder user interface for a camera.

FIG. 4A shows a block diagram of an exemplary embodiment of a viewfinder user interface 400 for a camera. For example, the UI 400 can be used with one or more of the devices discussed above for FIG. 1, in conjunction with an external and/or internal camera. The UI 400 comprises a display region 410. In embodiments depicted herein, a "display region" denotes a region that is shown on a device's display. That is, generally speaking, any user interface elements currently outside of the display region are not shown on the display. In some cases, the display region 410 occupies most or all of the display on which it appears, while in other cases the region 410 occupies only a portion of the display.

In FIG. 4A, a viewfinder region 420 (sometimes also called a "viewfinder pane" or "viewfinder display portion") appears in the display region 410. The viewfinder region 420 displays a viewfinder image 422 provided by a camera. The viewfinder image 422 represents a real-time view (either approximately or exactly) currently being seen through a lens of a camera and that can be captured by the camera at a given time. The viewfinder image 422 is updated at least a portion of the time based at least in part on data provided by the camera.

In the embodiment of FIG. 4A, at least a portion 432 of a first image region 430 (sometimes also called an "image pane" or "image display portion") appears in the display region 410. In some configurations, most or all of the first image region 430 appears in the display region 410 along with the viewfinder image 422 (i.e., the display region 410 is large enough to show multiple images). A first image 434 appears in the first image region 430. The first image 434 is a stored digital media (photo, video, etc.) previously taken using the camera or from another source (e.g., downloaded from a network, copied from a memory card) and stored somewhere in memory on the device. In some embodiments, the first image 434 and the viewfinder image 422 are displayed at the same or at approximately the same scale. In other embodiments, they are displayed at different scales.

Figure 4B:
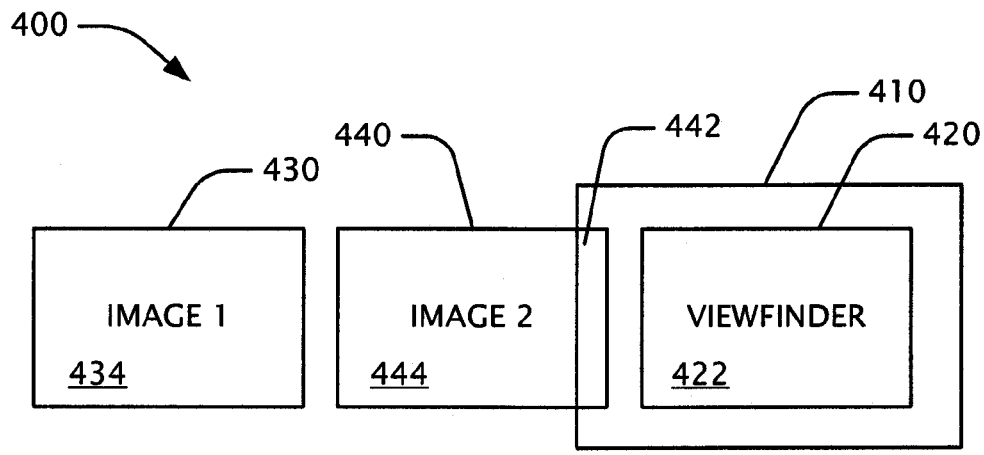

The viewfinder region 420 and the first image region 430 together form a collection of user interface elements that allows for viewing of the viewfinder image 422 and one or more other images, such as the first image 434. This collection of UI elements can be referred to as a "strip," a "filmstrip" or a "backroll." As shown in FIG. 4B, when an image 444 is taken with the camera, this image is displayed in a second image region 440, which is positioned relative to (e.g., adjacent) at least one of the viewfinder region 420 and the first image region 430. In the embodiment of FIG. 4B, the second image region 440 is positioned between the regions 420, 430. As a result, the first image region 430 is no longer visible in the display region 410. Instead, a portion 442 of the second image region 440 appears in the display region 410. Although the embodiments of FIGS. 4A and 4B (and of at least some other embodiments disclosed herein) show the viewfinder region 420 and one or more image regions as being positioned horizontally relative to the display region 410, in further embodiments these UI elements are organized in one or more other directions (e.g., vertically, diagonally).

In further embodiments, when the camera photographs an image, the image in the viewfinder region 420 is replaced with a preview version of the new image (sometimes referred to as a "capture preview" image). The preview version of the image is replaced with the captured image, which is moved to another position in the UI (e.g., second image region 440). Then an updated viewfinder image 442 is displayed again in the viewfinder region 420. In some versions, the viewfinder image 442 is shown as sliding into the viewfinder region 420.

Figure 4C:
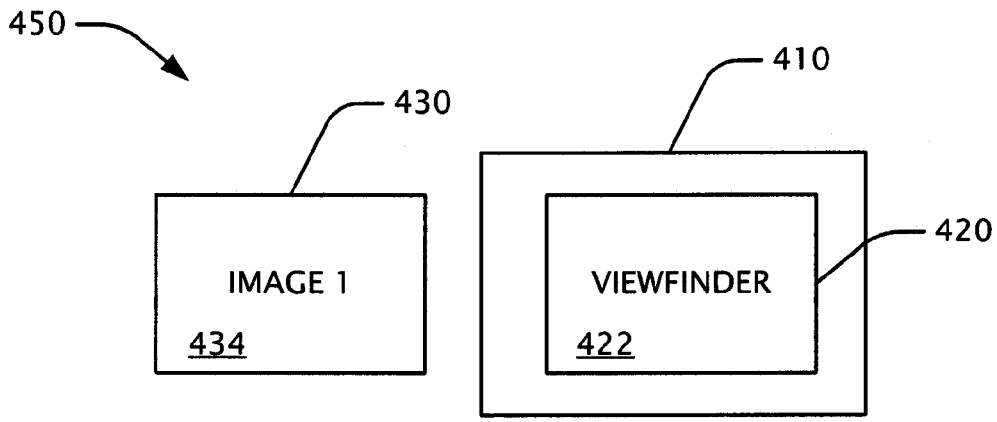

FIG. 4C shows an embodiment of a UI 450 that is similar to the UI 400 described above. However, in the UI 450, the first image region 430 does not overlap into the display region 410.

Figure 6A:
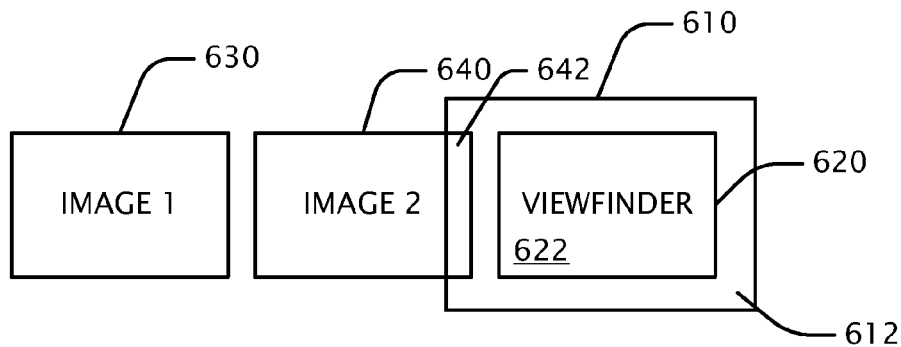
FIGS. 6A-6D show block diagrams of an exemplary embodiment of a user interface for viewing viewfinder images and captured images.
Figure 6B:
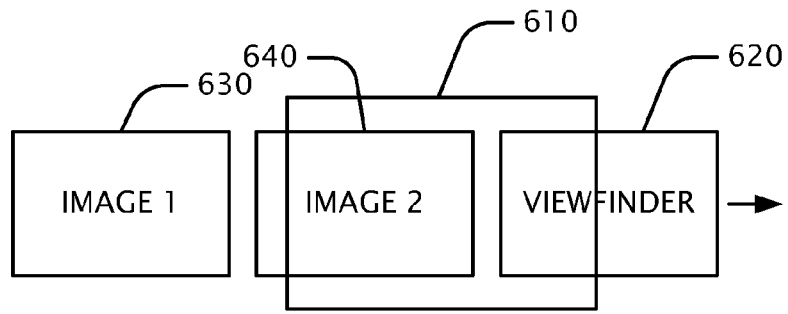
Figure 6C:
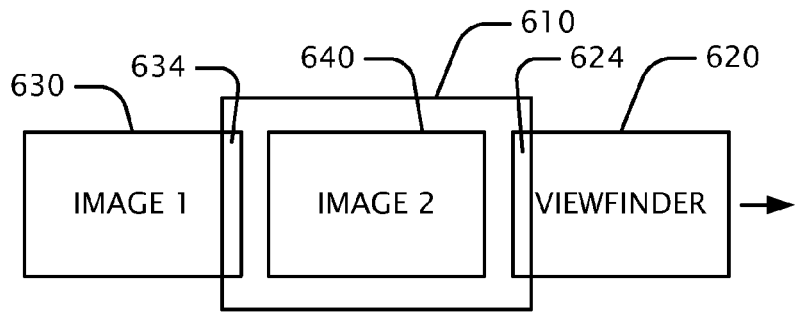

As shown in the embodiment of FIGS. 6A-6C, in some cases a viewfinder region 620 and first and second image regions 630, 640 can move relative to a display region 610. In FIG. 6A, only a portion 642 of the second image region 640 is visible. As the regions 620, 630, 640 move relative to the display region 610, the respective amounts of at least some of these regions that are visible in the display region 610 change. For example, as shown in FIG. 6B, as the regions 620, 630, 640 move left (relative to the display region 610), less of the viewfinder region 620 appears in the display region 610, and more of the second image region 640 becomes visible in the region 610. In FIG. 6C, the regions 620, 630, 640 have moved such that the second image region 640 is fully displayed in the display region 610 and only respective portions 624, 634 of the viewfinder region 620 and the first image region 630 appear in the display region 610. In various embodiments, such movement of these elements can occur in multiple directions (e.g., left, right, up, down, diagonally). In further embodiments, movement of these elements can occur in multiple dimensions (e.g., both vertically and horizontally). In particular embodiments, the regions 620, 630, 640 move relative to the display region 610 and relative to one or more other UI elements shown in the display region (e.g., background region 612, shown in FIG. 6A).

In some cases, this movement is performed in response to one or more user inputs. For example, if a user slides a finger across a portion of a touch-sensitive display on which the viewfinder region 620 appears, the region 620 can move across the display region 610 in a corresponding direction. The user input can also comprise, for example, one or more of keyboard input, pen input, mouse input, voice command input and rocker switch input.

Figure 6D:
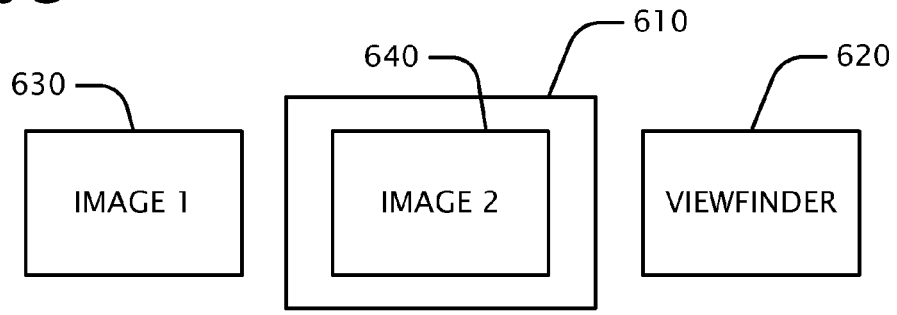

FIG. 6D depicts an alternative embodiment where the regions 620, 630, 640 can be positioned relative to the display region 610 such that, for example, the regions 620, 630 do not necessarily appear at all in the display region 610 when the region 640 appears in the display region 610.

Figure 7:
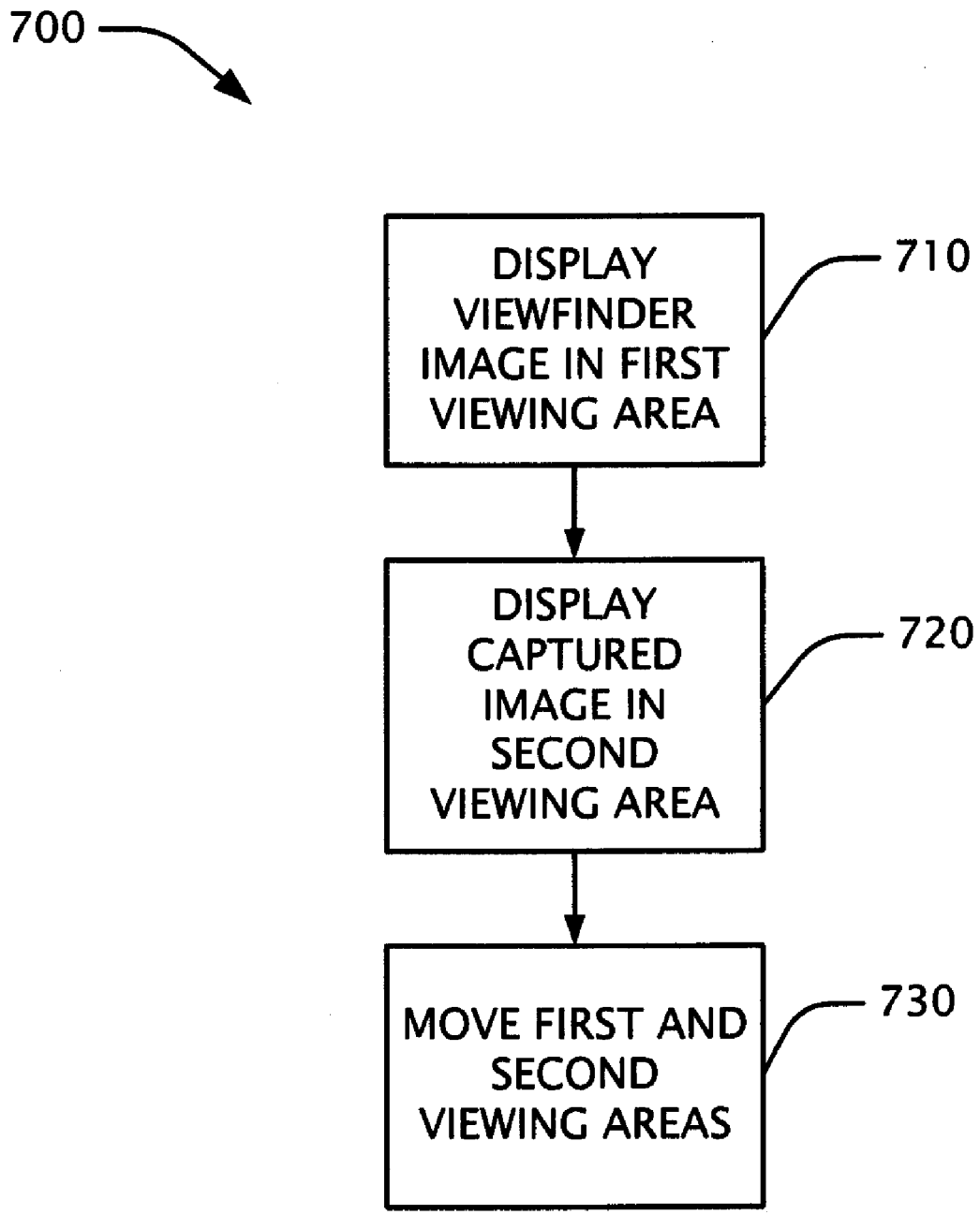
FIG. 7 shows a flowchart of an exemplary embodiment of a method for displaying a viewfinder image and a captured image.

FIG. 7 shows a flowchart of an exemplary embodiment of a method 700 for displaying images in a user interface on a display (e.g., a user interface such as that described for FIGS. 6A-6C). In a method act 710, a real-time viewfinder image for a camera is displayed in a first viewing area in a display region. In a method act 720, another image (e.g., a previously photographed image, or an image from another source besides the camera) is displayed in a second viewing area in the display region. In some embodiments, the second viewing area displays only an edge portion of the other image. In a method act 730, the first and second viewing areas are moved in a generally unified or common direction. The movement can be in response to one or more user inputs. In some embodiments, the first and second viewing areas move with a "sliding" or "scrolling" motion across a portion of the display.

Thus, returning to the embodiment of FIGS. 6A-6C, for example, it is possible to "slide" or "scroll" among the viewfinder region 620 and one or more image display regions (e.g., regions 630, 640). This can allow a user to easily view both the viewfinder image and other images stored on a device (e.g., one or more images previously captured with the camera). These can be viewed, for example, without changing from one screen to another in a user interface. Instead, the viewfinder image and the other images "slide" or "scroll" across the display region 610. In the depicted embodiment, the viewfinder region 620 forms one end of the "strip" or "filmstrip" created by the regions 620, 630, 640, while the region 630 forms another end. In other words, a single UI "space" is provided for both taking and reviewing pictures. In some embodiments, the images stop moving (e.g., the strip stops moving) when one end or another of the strip is reached. For example, in some embodiments similar to that of FIGS. 6A-6C, the regions 620, 630, 640 stop moving rightward once some or all of the region 630 appears in the display region 610. Similarly, the regions 620, 630, 640 stop moving leftward once some or all of the region 620 appears in the display region 610. In further embodiments, once an end of the strip for a given scrolling direction is displayed, further scrolling in that direction causes the opposite end of the strip to be displayed in the display region 610 (e.g., one end of the strip "loops around" to the other end). In some cases scrolling past the end of a strip causes one or more archives of other images (e.g., older images, images in another category, images associated with one or more various websites) to be displayed. Some embodiments can also be configured to store one or more images to one or more locations as a result of a certain number of images being captured by the camera. For example, a device can upload a group of one or more photos to a website or to a computer as a result of X number of pictures being captured or as a result of a storage or picture count limit being reached.

In additional embodiments, the display region 610 shows the viewfinder region 620 in response to one or more user inputs (e.g., by pressing a camera hardware button). This can, for example, allow a user to return to the viewfinder image after looking at one or more other images in the strip, without having to scroll through all of the images between a currently displayed image and the viewfinder image.

Figure 5:
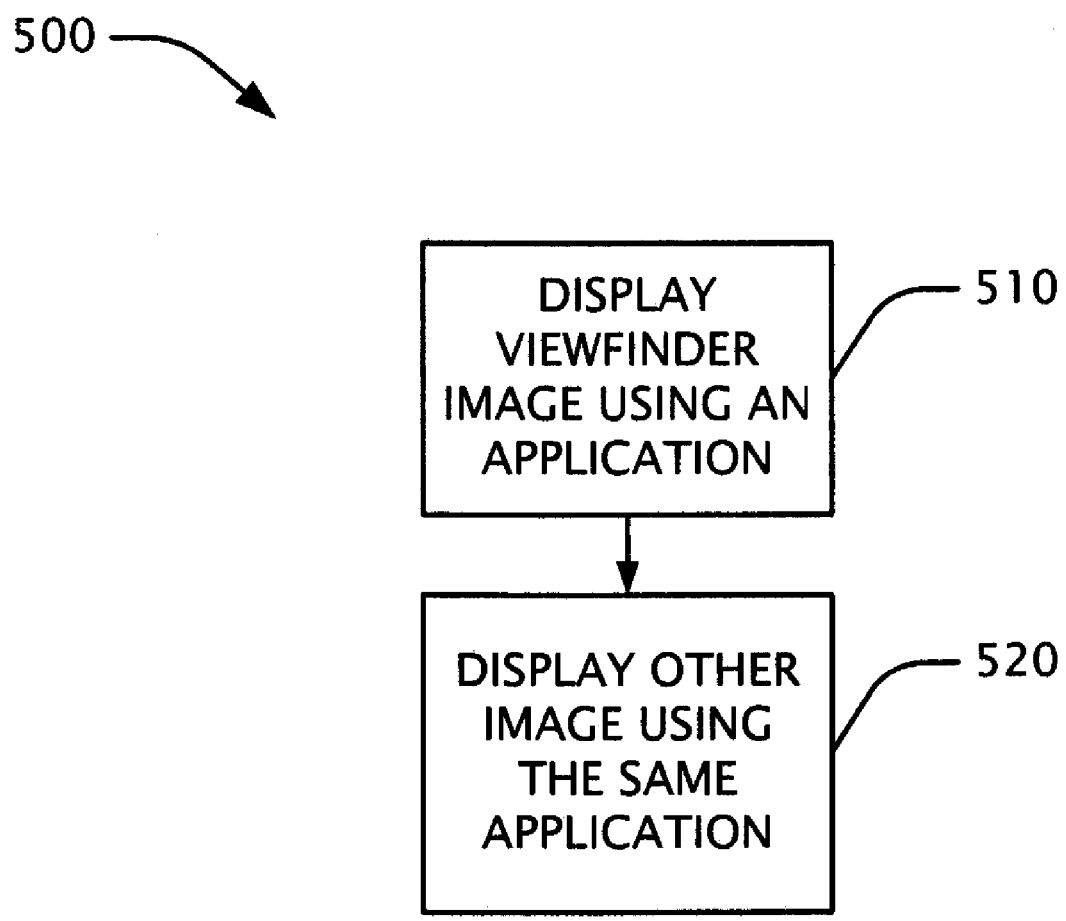
FIG. 5 shows a flowchart of an exemplary embodiment of a method for displaying a viewfinder image and a captured image.

FIG. 5 shows a block diagram of an exemplary embodiment of a method 500 for displaying a camera viewfinder image and an other image. In a method act 510, the viewfinder image is displayed on a display using a software application. In a method act 520, the other image (e.g., an image captured with a camera) is displayed on the display using the same software application such that digital media and the viewfinder image are concatenated to display a seamless transition between the viewfinder and stored images. It is not necessary to use separate applications to display both the viewfinder and other images.

In some embodiments, a new image can be added to a strip even if a viewfinder image is not shown on a display. Such a situation can arise if, for example, a device provides a user with an optical eyepiece instead of an electronic viewfinder image. Or, an electronic viewfinder image can be available but not displayed because, for example, a user has scrolled to other images in a strip such that the viewfinder image is not currently displayed. When a viewfinder image is not displayed, some embodiments of the disclosed technologies allow a user to take a picture and have it added to the strip. In some cases, regardless of whether a viewfinder image is displayed, an image can be added to an end location of a strip or to a user-selected location in the strip (e.g., according to a placeholder).

Figure 8:
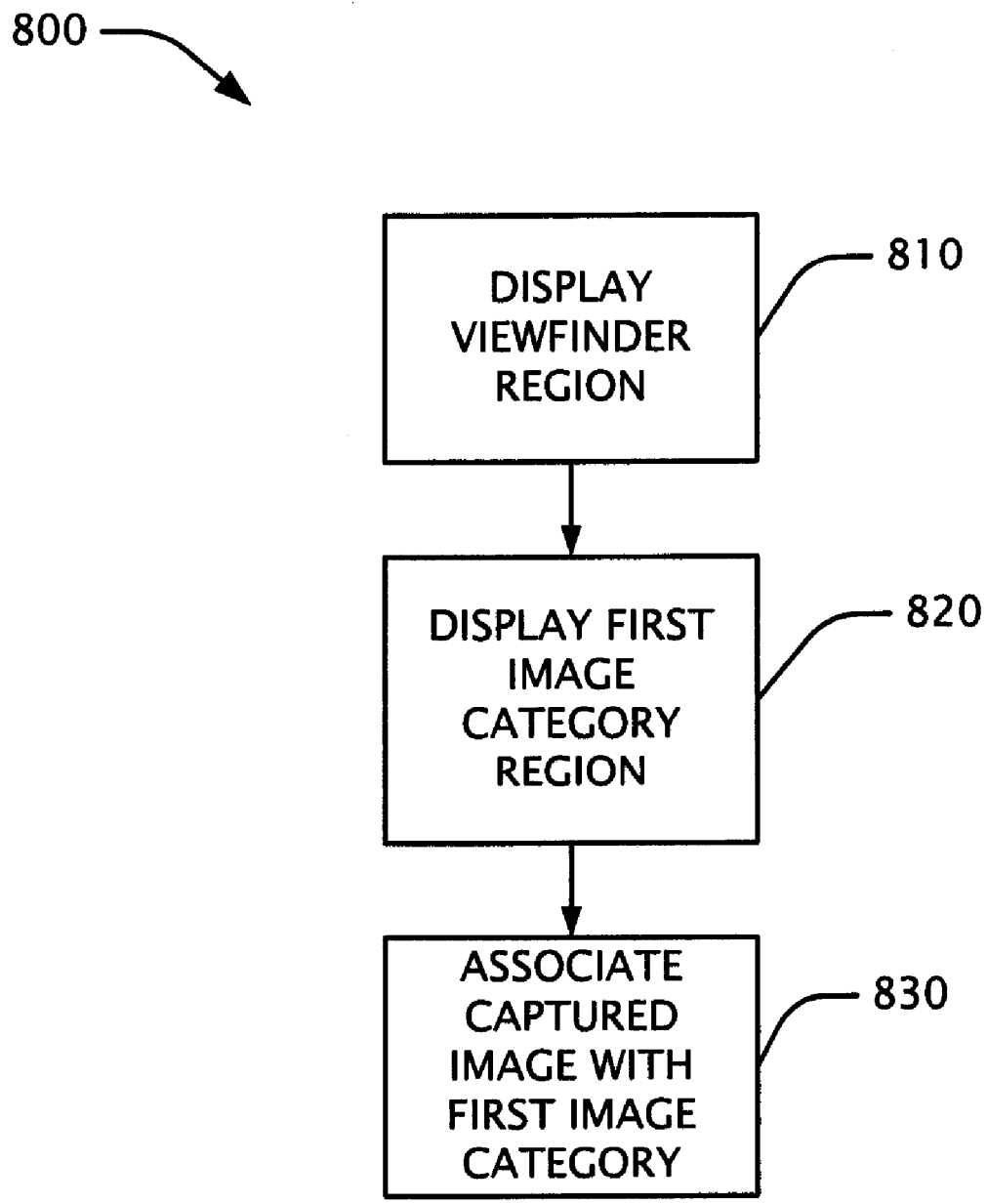
FIG. 8 shows a flowchart of an exemplary embodiment of a method for associating a captured image with one or more categories.

FIG. 8 shows a block diagram of an exemplary embodiment of a method 800 for associating an image with one or more categories. In a method act 810, a viewfinder region is displayed on a display. The viewfinder region displays, for example, one or more real-time images from a camera. In a method act 820, a first image category indicator or region is displayed in the display. An image category indicator comprises, for example, at least a portion of an image that is associated with the image category. Other types of image category indicators can also be used.

In particular embodiments, the first image category indicator is displayed in proximity to (e.g., next to or near) at least a portion of the viewfinder region. Based at least in part on the display of that indicator and the relative position of the first image category to the viewfinder region on the display, in a method act 830 an image captured with the camera is associated with a corresponding first image category. In further embodiments, two or more image category indicators are displayed in proximity to at least a portion of the viewfinder region, and an image captured with the camera is associated with the corresponding two or more image categories.

Figure 9:
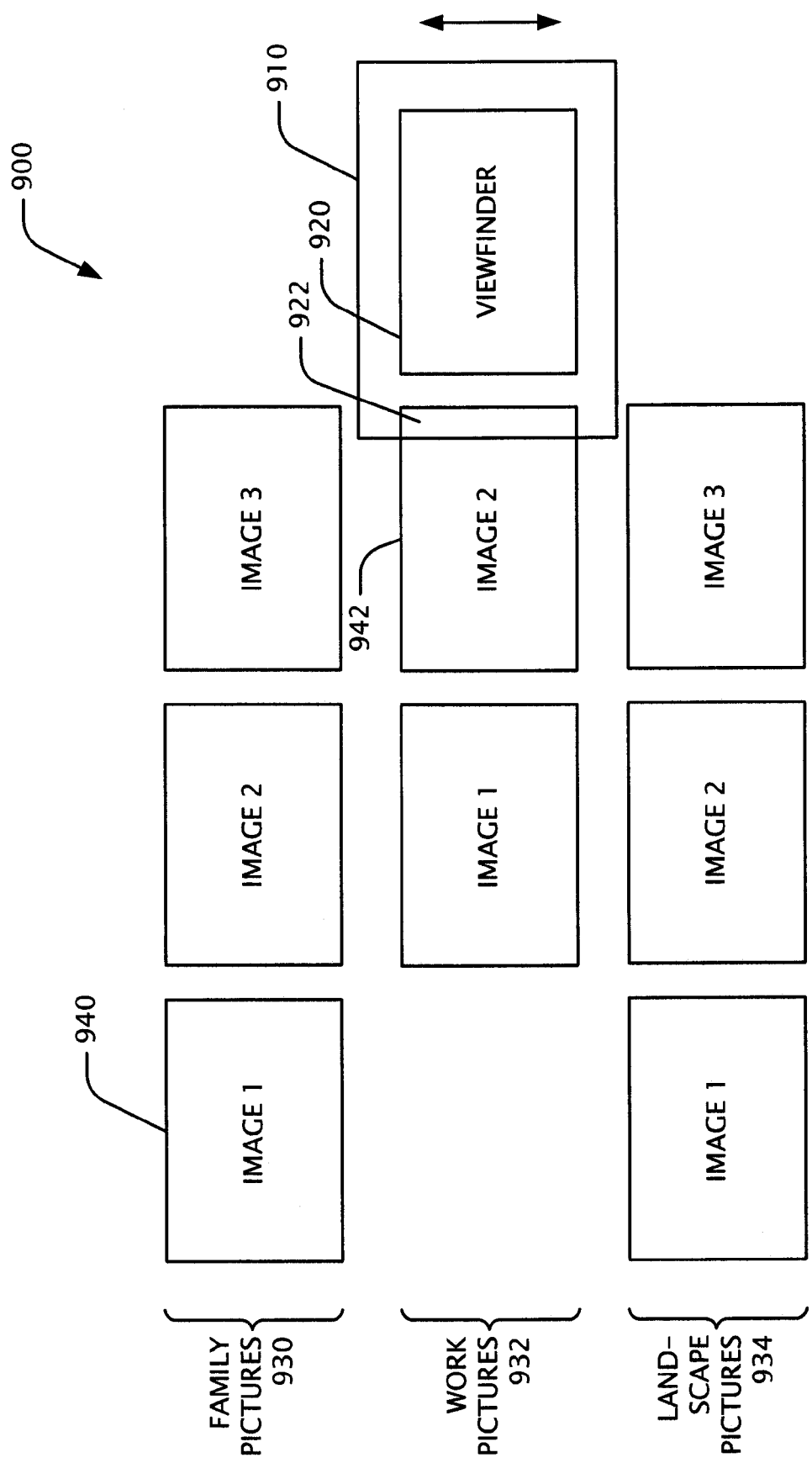
FIG. 9 shows a block diagram of an exemplary embodiment of a user interface for associating a captured image with one or more categories.

FIG. 9 shows a block diagram of an embodiment of a user interface 900 for associating an image captured by a camera with one or more categories. The UI 900 can be used with, for example, one or more embodiments of the method 800.

The user interface 900 comprises a display region 910. The UI 900 has one or more associated image categories. In the depicted embodiment, these categories are a family pictures category, a work pictures category and a landscape pictures category. Each category has a group or series of one or more images associated with it. In this case, family pictures 930 (including an image 940) are associated with the family pictures category, work pictures 932 are associated with the work pictures category, and landscape pictures 934 are associated with the landscape pictures category.

In the depicted configuration, the viewfinder region 920 is closest to an image 942 associated with the work pictures category (e.g., the viewfinder region 420 is in the same "row" as the image 942 and the other images of the work pictures 932). A portion 922 of the image 942 appears in the display region 910 and serves as an image category indicator for the work pictures category. Accordingly, when a picture is taken with the camera, it is added to the series of work pictures 932.

The viewfinder region 920 can be scrolled relative to the rows representing the groups 930, 932, 934 to change the category with which a newly captured image should be associated. For example, scrolling the viewfinder region 920 (e.g., in response to a user input) such that it is closest to a picture in the family pictures 930 results in the viewfinder being associated with a different series of images (i.e., the family picture category). Newly captured images are then associated with the family pictures 930.

In further embodiments, having an image associated with a given category causes (at least in part) that image to be associated, for example, with one or more interne addresses, file names, user accounts, hardware devices or computing clouds. For example, the images can be uploaded to a social networking or photo display website.

In some embodiments, the UI 900 is combined with one or more embodiments of the UI elements shown in FIGS. 6A-6C. For example, the viewfinder region 920 and the pictures of the category with which the viewfinder region is currently associated can be slid or scrolled across at least a portion of the display region 910.

Figure 10:
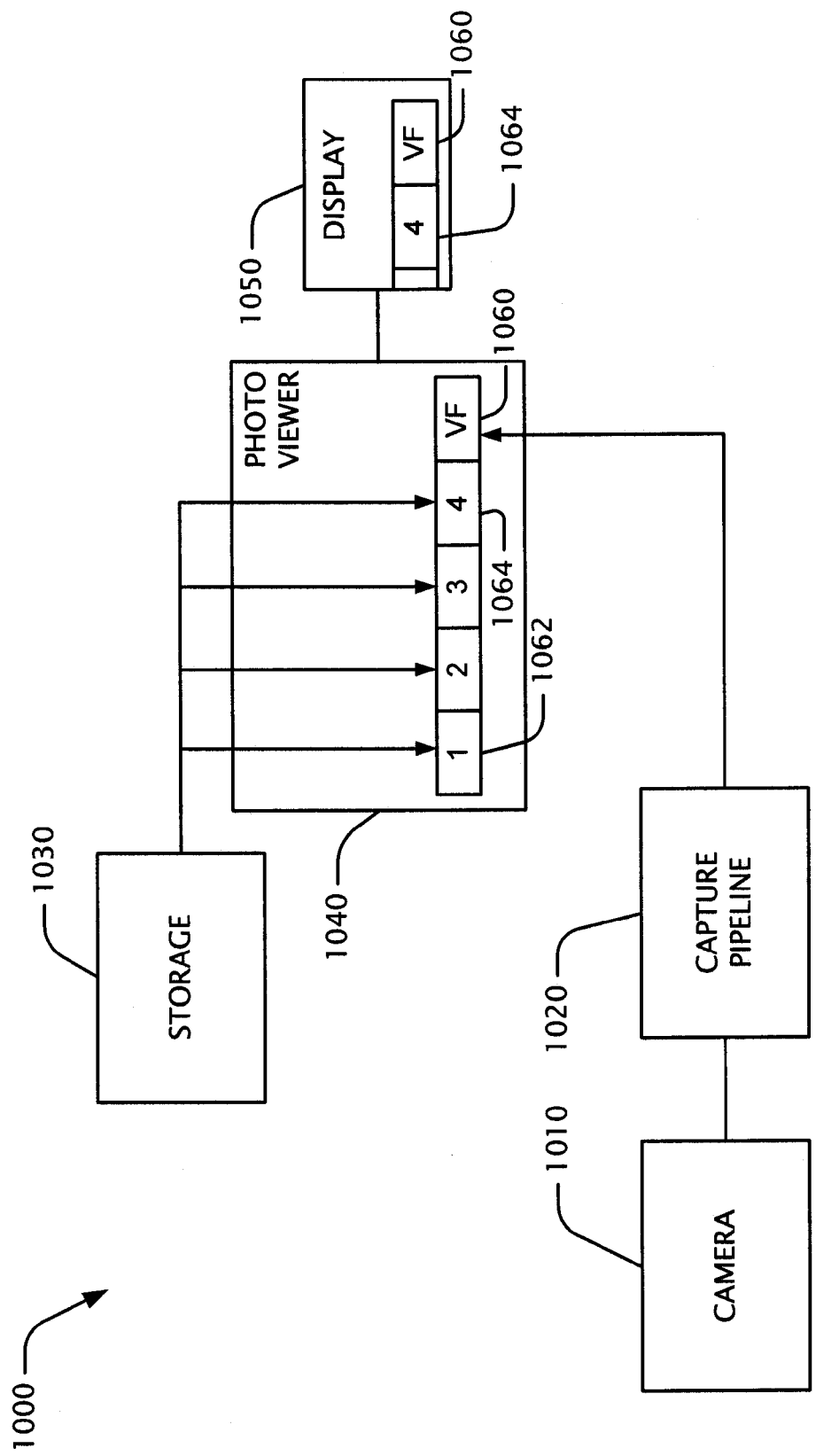
FIG. 10 shows a block diagram of an exemplary embodiment of a system for implementing one or more technologies described herein.

FIG. 10 shows a block diagram of an exemplary embodiment of a system 1000 for implementing one or more technologies described herein. The system 1000 comprises a camera 1010, a display 1050 and one or more types of computer-readable storage 1030. The storage 1030 contains one or more digital media files (e.g., still images and/or video clips). A photo viewer software component 1040 contains logic for displaying data from the storage 1030 (e.g., previously captured pictures 1062, 1064) and data from the camera 1010 (e.g., a viewfinder image 1060) on the display 1050 in a seamless integrated fashion (e.g., concatenated in a strip or other configuration). Data from the camera 1010 passes to the photo viewer software component 1040 through a capture pipeline software component 1020, which acts as an interface between the camera 1010 and the component 1040.

The photo viewer software component 1040 also contains logic for modifying user interface elements for showing on the display 1050. For example, the component 1040 comprises logic for scrolling viewfinder images and previously captured images on the display. In the depicted embodiment, the viewfinder image 1060 and the previously captured picture 1064 appear on the display 1050.

Although at least some of the embodiments disclosed herein describe capturing and/or displaying video and still images, further embodiments of the disclosed technologies can be used with other media, data or file types. For example, at least some of the disclosed technologies can be applied more generally to active content and passive content. "Active content" can comprise content that is being provided by or received by a device in real-time. "Passive content" can comprise content that was previously recorded or received by the device.

For example, in some scenarios "active content" could comprise an audio file that is currently being recorded, while "passive content" could comprise previously recorded audio files. In other scenarios, "active content" could comprise a web or desktop search that is currently being performed, while "passive content" could comprise results of one or more previous searches. In a given embodiment, "active content" and "passive content" do not necessarily need to be of the same type. For example, one could comprise still images while the other comprises audio data. One or more of the disclosed technologies can be used to allow a user to experience both the active content and the passive content simultaneously (e.g.: view information about a previously recorded audio file while recording a new audio file; or, view the results of a current search and a previous search). The active and passive content can be handled by a single application and/or using a single UI screen.

In view of the many possible embodiments to which the principles of the disclosed technologies can be applied, it should be recognized that the illustrated embodiments are only examples of these technologies and should not be taken as limiting the scope of the invention. Rather, the scope of the invention is defined by the following claims. We therefore claim as our invention all that comes within the scope and spirit of these claims.

We claim:

1. A graphical user interface comprising:
   a viewfinder display portion configured to display in a strip, on a hardware display, at least a portion of one or more real-time images received through a lens of at least one imaging device; and
   a stored image display portion configured to display in the strip, on the hardware display, at least a portion of one or more stored images, wherein the viewfinder display portion and the stored image display portion are configured to move in a common direction on the hardware display in response to one or more user inputs so that the viewfinder display portion configured to display at least a portion of the one or more real-time images received through the lens and the stored image display portion appear in the same strip and are simultaneously moveable onto and off of the hardware display.

2. The graphical user interface of claim 1, wherein only a portion of the one or more real-time images is visible on the hardware display.

3. The graphical user interface of claim 2, wherein the one or more real-time images are updated for at least a period of time.

4. The graphical user interface of claim 1, wherein the viewfinder display portion and the stored image display portion are configured to move in a common direction on the hardware display in response to one or more user inputs and relative to one or more other graphical user interface elements.

5. The graphical user interface of claim 1, wherein only a portion of the one or more stored images is visible on the hardware display.

6. The graphical user interface of claim 1, wherein the user interface is configured to receive one or more commands for processing the one or more stored images.

7. The graphical user interface of claim 1, wherein at least some of the one or more stored images represent still images that were captured by the at least one imaging device.

8. The graphical user interface of claim 1, wherein at least some of the one or more stored images represent video sequences.

9. The graphical user interface of claim 1, wherein the viewfinder display portion and the stored image display portion are configured to move in the common direction using a scrolling motion.

10. The graphical user interface of claim 1, further configured to display, in a first viewing area portion, one or more captured images in place of the viewfinder image.

11. One or more computer-readable storage media comprising instructions which, when executed by a computer, cause the computer to display the graphical user interface of claim 1.

12. An electronic device configured to display the graphical user interface of claim 1.

13. A graphical user interface comprising:
    a new element region for displaying a representation of a new media element to be captured, the new element region displaying real-time images received through a lens of a camera so that the new media element can be captured;
    a first media category region associated with a first media element category; and
    a second media category region associated with a second media element category, wherein the new element region is configured to be movably positioned relative to the first media category region and/or relative to the second media category region to indicate one or more categories with which the new media element to be captured is to be associated, so that a newly captured media element is combinable with at least one of the first media category region and the second media category region.

14. The graphical user interface of claim 13, wherein the new element region is configured to be displayed as sliding relative to the first media category region and the second media category region.

15. The graphical user interface of claim 13, the first media element category region being configured to display one or more media elements associated with the first media element category, and the second media element category region being configured to display one or more media elements associated with the second media element category.

16. One or more computer-readable storage media having encoded thereon instructions which, when executed by a processor, cause the processor to display the graphical user interface of claim 13.

17. An electronic device configured to display the graphical user interface of claim 13.

18. A computer-implemented method comprising:
    displaying, on a hardware display, an active content display portion, which includes a viewfinder that displays images being received through a lens on a camera for the purpose of image capturing; and
    displaying, on the hardware display, a passive content display portion that displays stored images that have already been captured, the active content display portion and the passive content display portion being configured to move simultaneously in a common direction on the hardware display in response to one or more user inputs and relative to one or more other elements being displayed on the hardware display.

19. The method of claim 18, the active content display portion being configured to display one or more viewfinder images, and the passive content display portion being configured to display one or more previously recorded images.

* * * * *